US012775139B2

(12) United States Patent
Taira

(10) Patent No.: US 12,775,139 B2
(45) Date of Patent: Oct. 27, 2026

(54) OPTICAL FIBER CABLE WITH OPTICAL CONNECTOR, METHOD FOR MANUFACTURING OPTICAL FIBER CABLE WITH OPTICAL CONNECTOR, AND OPTICAL CONNECTOR

(71) Applicant: SEIKOH GIKEN CO., LTD., Chiba (JP)

(72) Inventor: Junji Taira, Matsudo (JP)

(73) Assignee: SEIKOH GIKEN CO., LTD., Matsudo (JP)

( * ) Notice: Subject to any disclaimer, the term of this patent is extended or adjusted under 35 U.S.C. 154(b) by 309 days.

(21) Appl. No.: 18/565,045

(22) PCT Filed: Mar. 29, 2023

(86) PCT No.: PCT/JP2023/012749
§ 371 (c)(1),
(2) Date: Nov. 28, 2023

(87) PCT Pub. No.: WO2023/190651
PCT Pub. Date: Oct. 5, 2023

(65) Prior Publication Data

US 2024/0369781 A1 Nov. 7, 2024

(30) Foreign Application Priority Data

Mar. 31, 2022 (JP) ................................ 2022-057954

(51) Int. Cl.
*G02B 6/38* (2006.01)

(52) U.S. Cl.
CPC ................................. *G02B 6/3857* (2013.01)

(58) Field of Classification Search
CPC ................................................... G02B 6/3857
See application file for complete search history.

(56) References Cited

U.S. PATENT DOCUMENTS 5,058,984 A 10/1991 Bulman et al.
6,302,594 B1 * 10/2001 Lee ..................... G02B 6/3888 385/86

(Continued)

FOREIGN PATENT DOCUMENTS

CN 102084277 A 6/2011
CN 103959118 A 7/2014

(Continued)

OTHER PUBLICATIONS

International Search Report for International Application No. PCT/JP2023/012749 dated Jun. 6, 2023, Japan, 3 pages.

(Continued)

*Primary Examiner* — Rhonda S Peace
(74) *Attorney, Agent, or Firm* — United IP Counselors, LLC

(57) ABSTRACT

An optical fiber cable with an optical connector includes an optical fiber cable and an optical connector. The optical connector includes an optical connector plug, a crimping member, and a cylinder member. The cylinder member is attached to the cylindrical part in such a manner that an inner circumferential surface of the cylinder member is in contact with an outer circumferential surface of the cylindrical part. An inner circumferential surface of the crimping member is at least partially crimped to at least a part of an outer circumferential surface of the cylinder member while having a tension member of the optical fiber cable therebetween, at a first position in an axial direction. The inner circumferential surface of the crimping member is at least partially crimped to an outer jacket of the optical fiber cable, at a second position in the axial direction.

16 Claims, 11 Drawing Sheets

(56) References Cited

U.S. PATENT DOCUMENTS

| | | | | |
|---|---|---|---|---|
| 6,351,593 | B1 | 2/2002 | Pollack et al. | |
| 7,431,515 | B1 * | 10/2008 | Penumatcha | G02B 6/3855 385/86 |
| 7,712,973 | B2 * | 5/2010 | DiMarco | G02B 6/3857 385/98 |
| 9,016,953 | B2 | 4/2015 | Ott et al. | |
| 2009/0310919 | A1 | 12/2009 | Arai et al. | |
| 2010/0158452 | A1 | 6/2010 | Takahashi et al. | |
| 2011/0097044 | A1 | 4/2011 | Saito et al. | |
| 2014/0064665 | A1 | 3/2014 | Ott et al. | |
| 2014/0254989 | A1 | 9/2014 | Takahashi et al. | |
| 2014/0341511 | A1 | 11/2014 | Daems et al. | |
| 2015/0131945 | A1 | 5/2015 | Scopic et al. | |
| 2015/0293313 | A1 | 10/2015 | Ott et al. | |
| 2020/0241217 | A1 | 7/2020 | Smith et al. | |
| 2024/0369781 | A1 * | 11/2024 | Taira | G02B 6/3888 |

FOREIGN PATENT DOCUMENTS

| | | | |
|---|---|---|---|
| CN | 104364686 | A | 2/2015 |
| EP | 2296023 | A1 | 3/2011 |
| EP | 2770355 | A1 | 8/2014 |
| JP | 2001-235657 | A | 8/2001 |
| JP | 2009-109978 | A | 5/2009 |
| JP | 2010-286795 | A | 12/2010 |
| JP | 2011-070078 | A | 4/2011 |
| JP | 2011-107590 | A | 6/2011 |
| JP | 2013-114001 | A | 6/2013 |
| JP | 5281959 | B2 | 9/2013 |
| JP | 2015-508188 | A | 3/2015 |
| KR | 10-2014-0126393 | A | 10/2014 |
| WO | 2010/004772 | A1 | 1/2010 |
| WO | 2013/080923 | A1 | 6/2013 |
| WO | 2013/117589 | A2 | 8/2013 |
| WO | 2013/126429 | A2 | 8/2013 |
| WO | 2020/077700 | A1 | 4/2020 |

OTHER PUBLICATIONS

Extended European Search Report of corresponding European patent application No. 23780660.9 dated Apr. 2, 2026, 10 pages.

* cited by examiner

OPTICAL FIBER CABLE WITH OPTICAL CONNECTOR, METHOD FOR MANUFACTURING OPTICAL FIBER CABLE WITH OPTICAL CONNECTOR, AND OPTICAL CONNECTOR

CROSS-REFERENCE TO RELATED APPLICATIONS

This application is a National Stage Entry application of PCT International Application No. PCT/JP2023/012749, filed on Mar. 29, 2023, which claims the priority benefit of Japanese Patent Application No. 2022-057954, filed on Mar. 31, 2022, the entire contents of both of which are hereby incorporated by reference.

BACKGROUND

1. Technical Field

The present invention relates to an optical fiber cable with an optical connector, a method for manufacturing an optical fiber cable with an optical connector, and an optical connector.

2. Description of the Background

Methods for attaching optical connectors to optical fiber cables are conventionally known. One of such methods includes interposing a tension member that is contained in an optical fiber cable, between a cylindrical part of an optical connector plug and a crimping ring (swaging ring) of an optical connector, and fixing it by crimping.

In one example, Japanese Patent No. 5281959 discloses an optical fiber code with an optical connector, which is assembled by fitting a stop ring and a plug frame of an optical connector to form a cylindrical part, interposing a tension member between the stop ring and a swaging ring, and swaging (crimping) the stop ring and the swaging ring.

BRIEF SUMMARY

Normally, standard optical connectors are designed to be attached to optical fiber cables having outer diameters of not greater than 3 mm, but there is a demand to attach a standard optical connector to an optical fiber cable having a relatively large outer diameter. For example, it may be desired to attach a standard LC connector to an optical fiber cable having an outer diameter of 4 to 6 mm, which is often used outdoors. There are basically two methods for attaching a standard optical connector to an optical fiber cable having a relatively large outer diameter.

In the first method, a dedicated optical connector plug is prepared by enlarging a cylindrical part of the optical connector plug so as to have a size close to an inner diameter of a crimping ring that has a relatively large diameter in accordance with an optical fiber cable. This first method, however, increases cost due to the need for the dedicated optical connector plug.

In the second method, an inner surface of a part on an optical connector plug side of a crimping ring is reduced in diameter so as to correspond to a cylindrical part of a standard optical connector plug. This crimping ring is reduced in diameter on a leading end side so as to correspond to a cylindrical part of a standard optical connector plug while having a size corresponding to a large diameter of an optical fiber cable, on a trailing end side. Thus, the second method uses a dedicated component having two different diameters, as a crimping ring.

Moreover, the total length of an optical connector is increased. Specifically, in order to fix an optical fiber to a ferrule by bonding and to draw out a tension member of an optical fiber cable to a cylindrical part of an optical connector plug, a space is required between the cylindrical part and a crimping ring. In addition, crimping the crimping ring to the cylindrical part requires that a large diameter part of the crimping ring has a length that allows the crimping ring to slide to a leading end side in an axial direction relative to the optical fiber cable. Furthermore, the axial length of a small diameter part of the crimping ring should be not less than the width of a crimping tool. For these reasons, a crimping ring that is long in the axial direction is required, resulting in an increase in the total length of an optical connector.

In view of these circumstances, an object of the present invention is to enable attaching an optical fiber cable having a relatively large outer diameter to a standard size optical connector plug, without increasing the total length of an optical connector.

A first aspect of the present invention is an optical fiber cable with an optical connector, comprising:

- an optical fiber cable; and
- an optical connector,
- the optical fiber cable comprising:
  - an optical fiber;
  - a coating member covering the optical fiber;
  - a tension member being disposed around the coating member; and
  - an outer jacket containing the optical fiber, the coating member, and the tension member,
- the optical connector comprising:
  - an optical connector plug having a ferrule and a cylindrical part, the ferrule being disposed so as to protrude from a leading end and being formed with an insertion hole for the optical fiber, the cylindrical part being provided so as to protrude from a trailing end that is on a side opposite to the leading end;
  - a crimping member being configured to fix the optical fiber cable to the optical connector plug by crimping; and
  - a cylinder member being interposed between the cylindrical part and the crimping member,
- the cylinder member being attached to the cylindrical part in such a manner that an inner circumferential surface of the cylinder member is in contact with an outer circumferential surface of the cylindrical part,
- the crimping member having a cylindrical shape,
- an inner circumferential surface of the crimping member being at least partially crimped to at least a part of an outer circumferential surface of the cylinder member while having the tension member of the optical fiber cable therebetween, at a first position in an axial direction at which the inner circumferential surface of the cylinder member is in contact with the outer circumferential surface of the cylindrical part,
- the inner circumferential surface of the crimping member being at least partially crimped to the outer jacket of the optical fiber cable, at a second position in the axial direction.

A second aspect of the present invention is a method for manufacturing an optical fiber cable with an optical connector, comprising:

- a step of passing an optical fiber cable through a cylindrical crimping member;

- a step of removing an outer jacket of the optical fiber cable to expose a coating member, which covers an optical fiber, and to expose a tension member, which is disposed around the coating member;
- a step of attaching a cylinder member to a cylindrical part that is provided to an optical connector plug, in such a manner that an inner circumferential surface of the cylinder member is in contact with an outer circumferential surface of the cylindrical part,
- a step of removing the coating member at a leading end of the optical fiber cable to expose the optical fiber;
- a step of fixing the optical fiber that is exposed, to a ferrule of the optical connector plug by bonding;
- a first crimping step of sliding the crimping member in an axial direction, and crimping at least a part of an inner circumferential surface of the crimping member to at least a part of an outer circumferential surface of the cylinder member while having the tension member of the optical fiber cable therebetween, at a first position in the axial direction at which the inner circumferential surface of the cylinder member is in contact with the outer circumferential surface of the cylindrical part; and
- a second crimping step of crimping at least a part of the inner circumferential surface of the crimping member to the outer jacket of the optical fiber cable, at a second position in the axial direction.

A third aspect of the present invention is an optical connector being configured to be attached to an optical fiber cable, the optical connector comprising:

- an optical connector plug having a ferrule and a cylindrical part, the ferrule being disposed so as to protrude from a leading end and being formed with an insertion hole for an optical fiber, the cylindrical part being provided so as to protrude from a trailing end that is on a side opposite to the leading end;
- a crimping member; and
- a cylinder member,
- the cylinder member being attached to the cylindrical part in such a manner that at least a part of an inner circumferential surface is in contact with at least a part of an outer circumferential surface of the cylindrical part,
- the crimping member having a cylindrical shape,
- the crimping member being disposed so that
  - at least a part of an inner circumferential surface of the crimping member is able to be crimped to at least a part of an outer circumferential surface of the cylinder member while having a tension member of the optical fiber cable therebetween, at a first position in an axial direction of the crimping member at which the inner circumferential surface of the cylinder member is in contact with the outer circumferential surface of the cylindrical part, and
  - at least a part of the inner circumferential surface of the crimping member is able to be crimped to an outer jacket of the optical fiber cable, at a second position in the axial direction of the crimping member.

One embodiment of the present invention enables attaching an optical fiber cable having a relatively large outer diameter to a standard size optical connector plug, without increasing the total length of an optical connector.

DETAILED DESCRIPTION

Hereinafter, an optical connector and an optical fiber cable with an optical connector according to one embodiment of the present invention will be described with reference to the attached drawings.

Figure 1A:
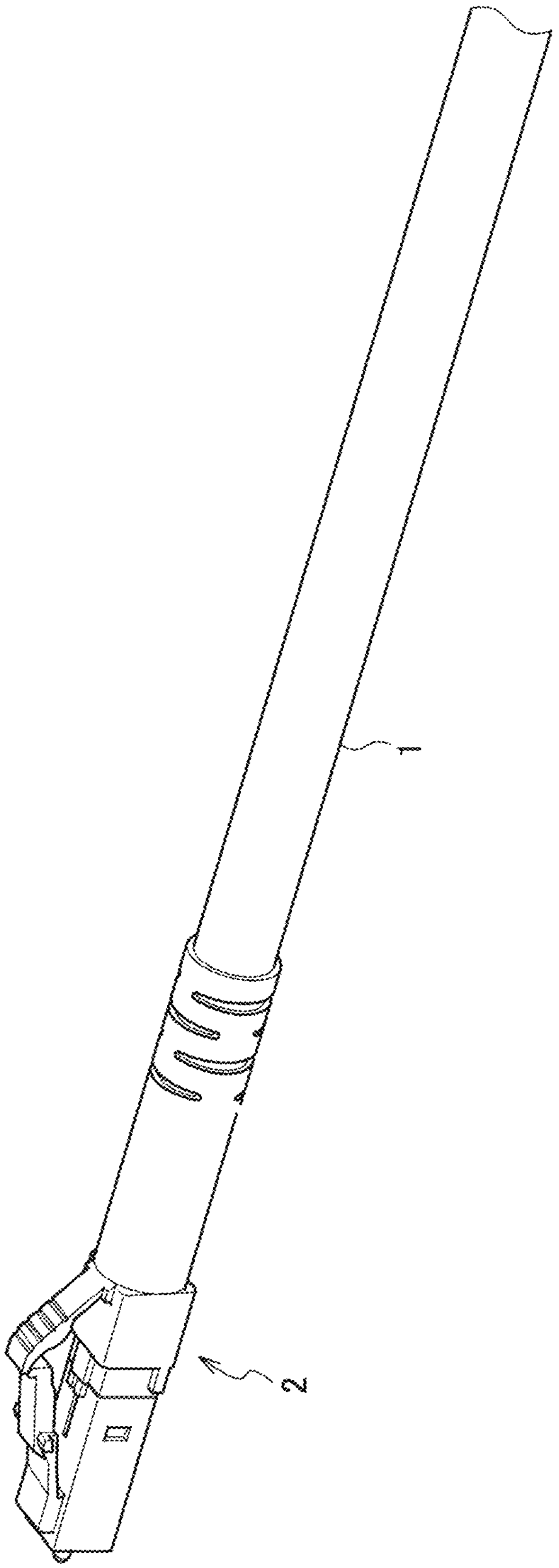
FIG. 1A is a perspective view of an optical fiber cable with an optical connector of one embodiment.
Figure 1B:
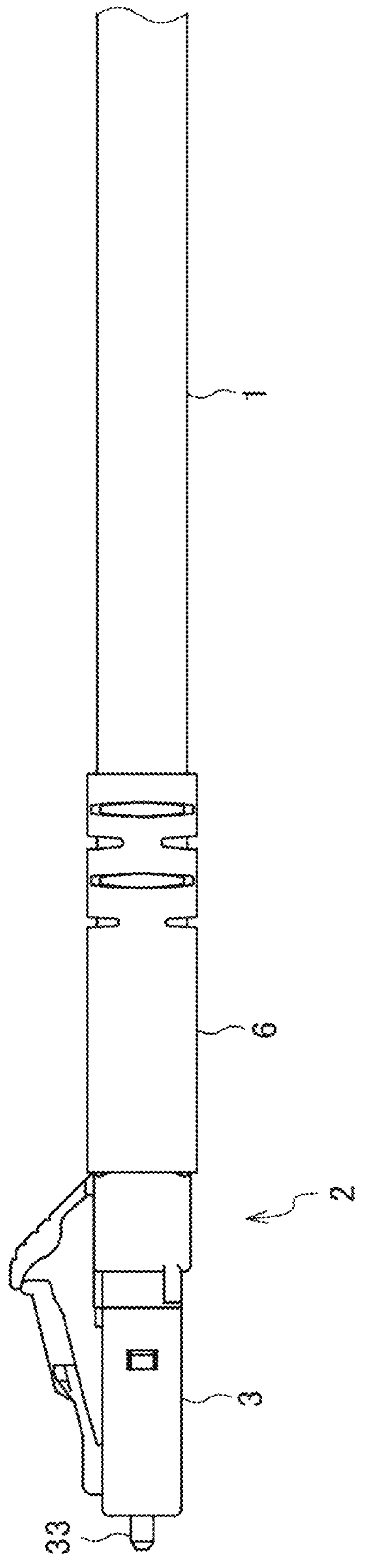
FIG. 1B is a side view of the optical fiber cable with the optical connector of one embodiment.
Figure 2:
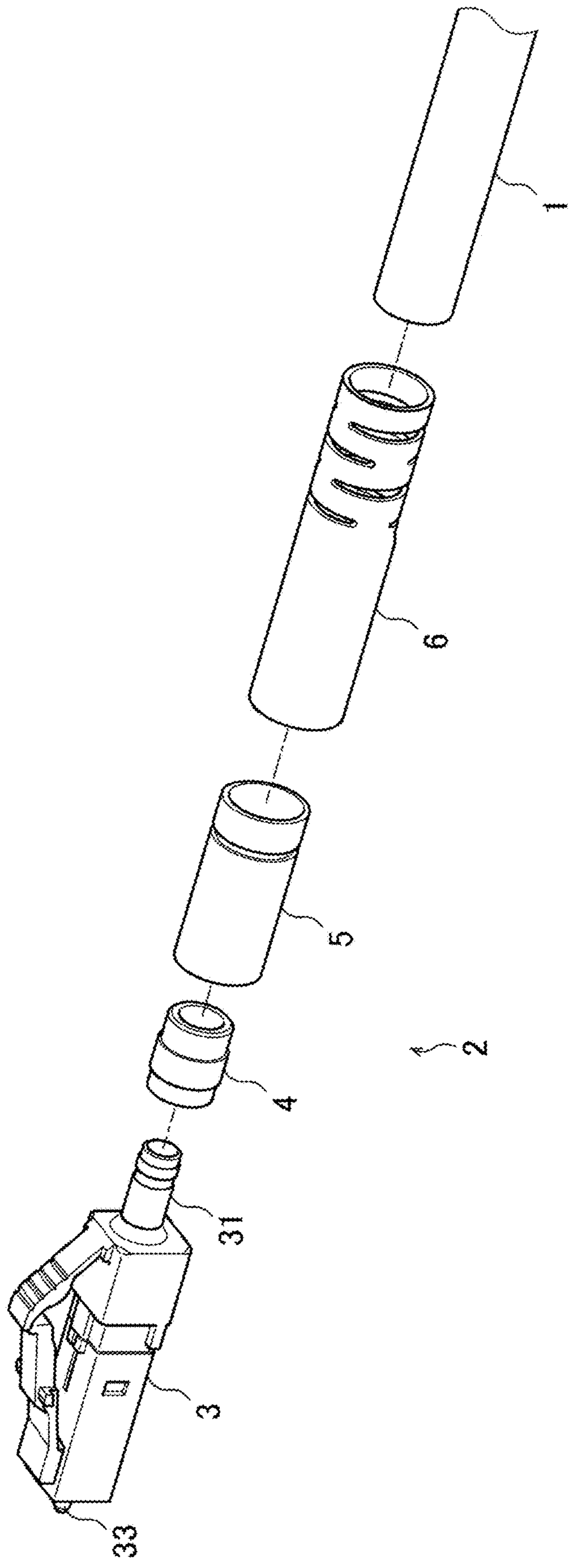
FIG. 2 is an exploded perspective view of the optical fiber cable with the optical connector of one embodiment.
Figure 3:
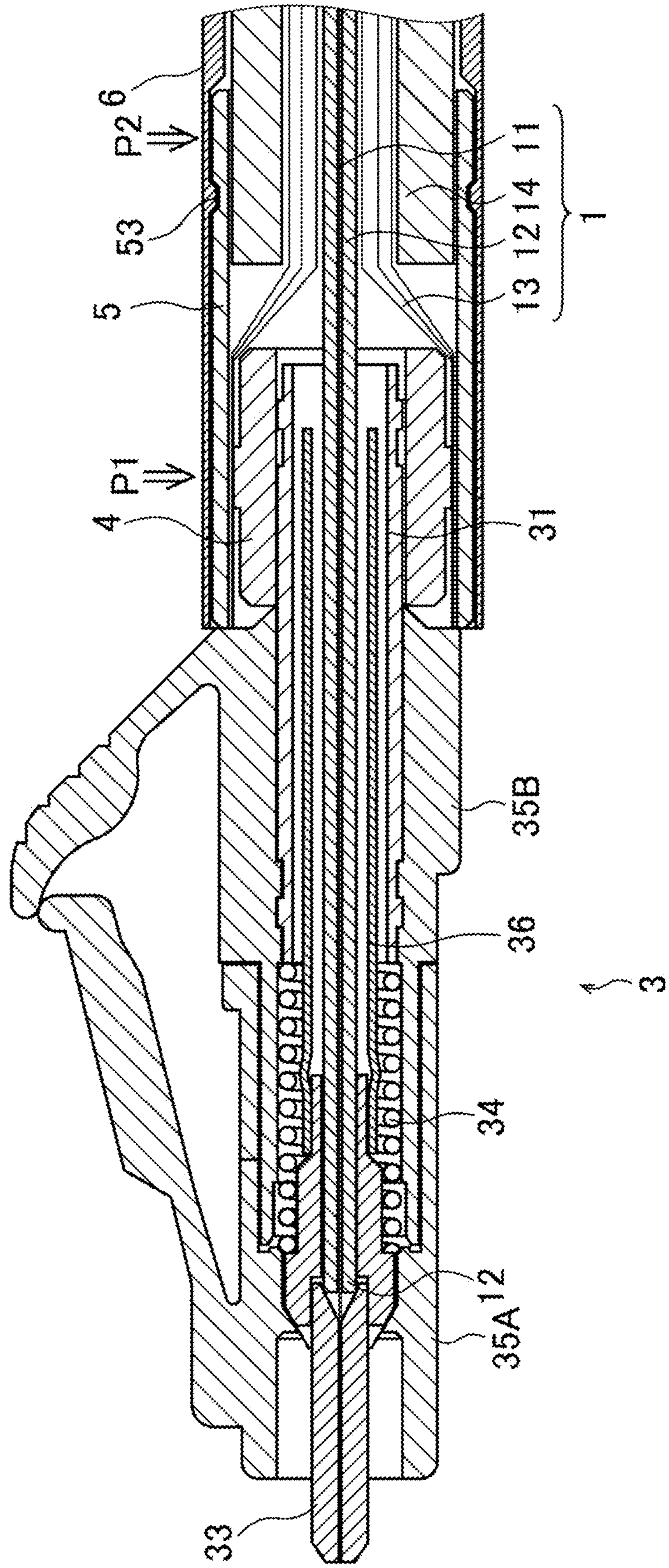
FIG. 3 is a sectional view of the optical fiber cable with the optical connector of one embodiment.

FIGS. 1A and 1B are respectively a perspective view and a side view of the optical fiber cable with the optical connector of one embodiment. FIG. 2 is an exploded perspective view of the optical fiber cable with the optical connector of one embodiment. FIG. 3 is a sectional view of the optical fiber cable with the optical connector, which corresponds to the side view in FIG. 1B.

As shown in FIGS. 1A and 1B, the optical fiber cable with the optical connector includes an optical fiber cable 1 and an optical connector 2.

As shown in FIG. 3, the optical fiber cable 1 has an optical fiber 11, a core wire 12, a tension member 13, and an outer jacket 14.

The optical fiber 11 includes a core and a clad on an outer side of the core and is structured such that a refractive index of the core is made higher than that of the clad in order to transmit light to the core at the center. Preferably, both of the core and the clad are made of quartz glass or plastic that has a high light transmittance.

The core wire 12 is disposed around the optical fiber 11 to protect it. Any material can be used for the core wire 12, but for example, silicon resin, nylon resin, elastomer, or UV-curable resin can be used.

The tension member 13 is provided so as to prevent the optical fiber 11 from being damaged, by alleviating tension that is generated in the optical fiber 11 covered with the core wire 12, when the optical fiber cable 1 is pulled or bent, for example. Although the material of the tension member 13 is not limited, examples of the material include aramid fibers, such as Kevlar (registered trademark), aramid fiber-reinforced plastics (AFRP), glass fibers, glass fiber-reinforced plastics (GFRP), polyethylene fibers, and polyethylene fiber-reinforced plastics.

The outer jacket 14 is disposed on an outer side of the tension member 13 so as to protect the optical fiber 11, which is covered with the core wire 12, and to protect the tension member 13. Any material can be used for the outer jacket 14, but for example, polyvinyl chloride resin or elastomer can be used. The outer diameter of the outer jacket

14 is greater than a cylindrical part 31 of the optical connector plug 3 and is 4 to 6 mm, for example.

With reference to FIG. 2, the optical connector 2 includes an optical connector plug 3, a cylinder member 4, a crimping ring 5, and a boot 6.

The optical connector plug 3 is a connector plug corresponding to an LC connector in the example shown in FIG. 2, but the kind of the optical connector plug 3 is not limited thereto and may be one that corresponds to a connector of another type, such as an SC connector. A ferrule 33 is disposed on a leading end side of the optical connector plug 3, and a cylindrical part 31 is provided on a trailing end side of the optical connector plug 3. For a standard LC connector, the outer diameter of the cylindrical part 31 is 3.05 mm.

In this disclosure, each constituent component will be described by assuming that a side on which the ferrule 33 protrudes as shown in FIG. 2, is a leading end side, whereas a side opposite thereto is a trailing end side, but this is only for convenience of explanation.

The crimping ring 5 is an example of a crimping member for fixing the optical fiber cable 1 to the optical connector plug 3 by crimping (swaging), and it has a cylindrical shape. As shown in FIG. 3, the crimping ring 5 contains the cylindrical part 31 of the optical connector plug 3 and the cylinder member 4 on a leading end side and also contains the outer jacket 14 of the optical fiber cable 1 on a trailing end side. Thus, the inner diameter of the crimping ring 5 is slightly greater than the outer diameter of the outer jacket 14 of the optical fiber cable 1. The length of the crimping ring 5 is preferably in a range of not less than 5 mm and not greater than 20 mm and is more preferably in a range of not less than 8 mm and not greater than 17 mm.

The outer circumferential surface of the crimping ring 5 is formed with an engaging groove 53 for preventing the boot 6 from coming off.

The inner diameter of the crimping ring 5 is set in accordance with the outer diameter of the outer jacket 14 of the optical fiber cable 1 and thereby greatly differs from the outer diameter of the cylindrical part 31 of the optical connector plug 3. For this reason, the optical connector 2 of one embodiment includes the cylinder member 4 that is interposed between the cylindrical part 31 of the optical connector plug 3 and the crimping ring 5.

The cylinder member 4 is attached to the cylindrical part 31 in such a manner that an inner circumferential surface is in contact with an outer circumferential surface of the cylindrical part 31. The outer circumferential surface of the cylinder member 4 is set slightly smaller than the inner diameter of the crimping ring 5. Specifically, the cylinder member 4 is disposed so as to absorb the difference between the inner diameter of the crimping ring 5 and the outer diameter of the cylindrical part 31.

In order to contain the tension member 13, which is exposed from the optical fiber cable 1, between the outer circumferential surface of the cylinder member 4 and the inner circumferential surface of the crimping ring 5, the outer diameter of the cylinder member 4 is preferably smaller than the inner diameter of the crimping ring 5 by the thickness of the tension member 13. The difference between the outer diameter of the cylinder member 4 and the inner diameter of the crimping ring 5 is preferably not less than 0.1 mm and not greater than 1 mm and is more preferably not less than 0.1 mm and not greater than 0.5 mm.

The cylinder member 4 can be attached to the cylindrical part 31 by any method, but preferably by crimping. Specifically, as described later, the cylinder member 4 is temporarily fixed to the cylindrical part 31 by crimping. The attaching method is, however, not limited thereto, and the cylinder member 4 may be attached to the cylindrical part 31 by press fitting.

In FIG. 3, the optical fiber cable 1 is fixed to the optical connector plug 3 as follows. The inner circumferential surface of the crimping ring 5 is at least partially crimped to at least a part of the outer circumferential surface of the cylinder member 4 while having the tension member 13 of the optical fiber cable 1 therebetween, at a first position P1 in the axial direction. The inner circumferential surface of the crimping ring 5 is also at least partially crimped to the outer jacket 14 of the optical fiber cable 1 at a second position P2 in the axial direction. Deformations of the crimping ring 5, the cylinder member 4, and the cylindrical part 31 of the optical connector plug 3 due to crimping are not illustrated in FIG. 3.

The boot 6 is provided to cover the crimping ring 5 and a part of the optical fiber cable 1 in order to protect the crimped parts of the crimping ring 5 and the optical fiber cable 1 from foreign substances, water drops, etc.

Figure 4:
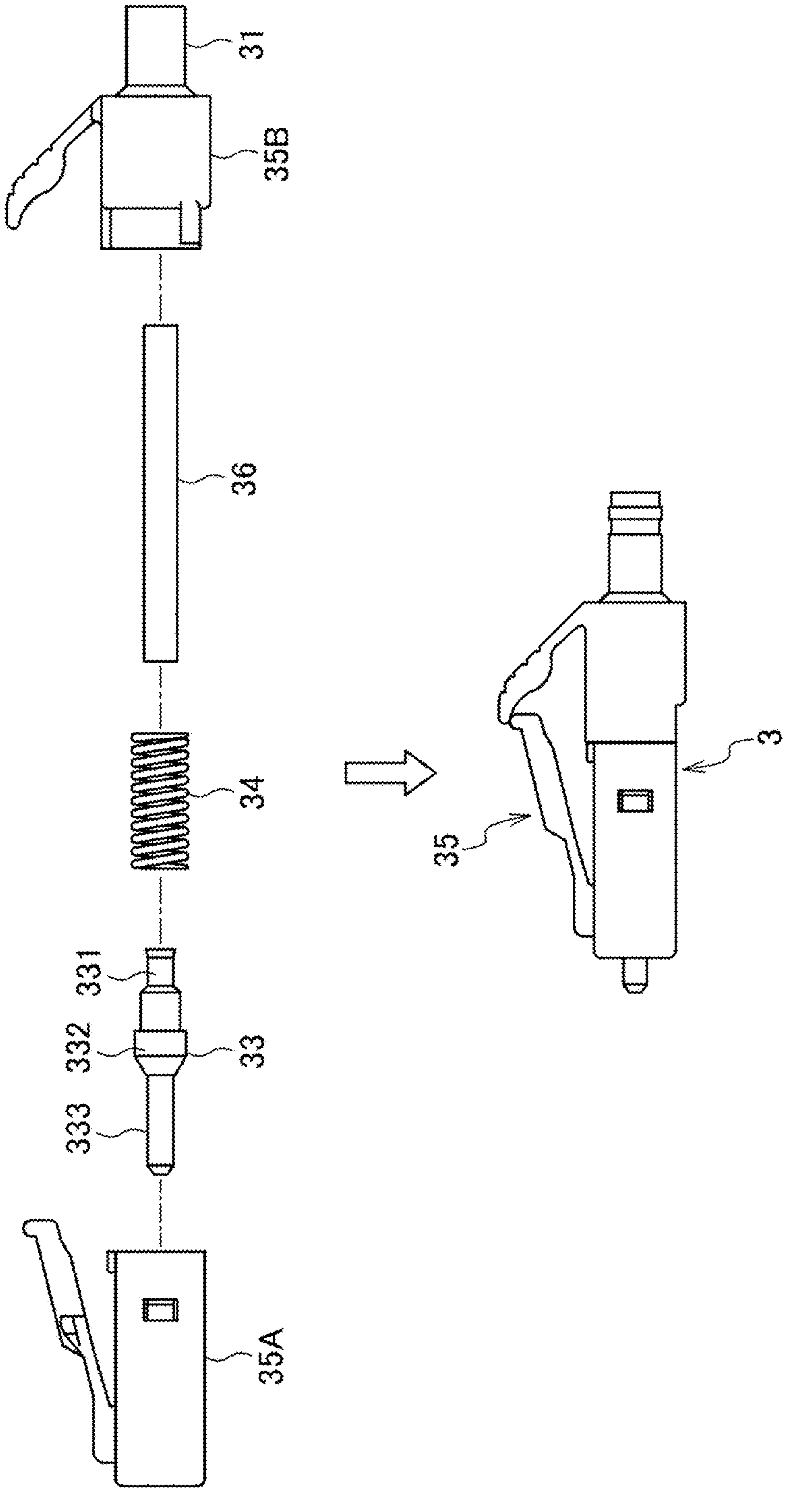
FIG. 4 shows constituent components of an optical connector plug of one embodiment.

FIG. 4 shows an exploded view of the optical connector plug 3. As shown in FIG. 4, the optical connector plug 3 includes a ferrule 33, a coil spring 34, and a tube 36.

The optical connector plug 3 has a resin plug housing 35 for containing the ferrule 33, the coil spring 34, and the tube 36. The plug housing 35 is composed of a first housing part 35A and a second housing part 35B. The first housing part 35A and the second housing part 35B are coupled by snap-fit, for example. The cylindrical part 31 is fixed to the second housing part 35B. The second housing part 35B is made by insert molding that uses a metal pipe corresponding to the cylindrical part 31 as an insert component.

In a case of using an LC connector, the ferrule 33 has a ferrule main body 333 at a leading end, and the ferrule main body 333 has an outer diameter of 1.249 mm and is formed with a through hole for allowing the optical fiber 11 of the optical fiber cable 1 to pass through.

The optical fiber 11 is fixed by inserting it into the through hole in which adhesive is already injected, and then heating them. The adhesive is, for example, thermosetting adhesive, and it is preferably epoxy adhesive or acrylic adhesive.

The coil spring 34 is supported at a leading end by a flange part 332 of the ferrule 33 and is also supported at a trailing end by a surface (not shown) of the second housing part 35B, whereby it biases the ferrule 33 to the leading end side.

The tube 36 is formed of flexible resin, such as polytetrafluoroethylene (PTFE), and it is attached to a trailing end part 331 of the ferrule 33. The tube 36 is provided in order to extend the flange part 332 of the ferrule 33 to the cylindrical part 31.

Next, cross sections of the cylindrical part 31 of the optical connector plug 3, the cylinder member 4, and the crimping ring 5 and a method for fixing them will be described with reference to FIG. 5.

Figure 5:
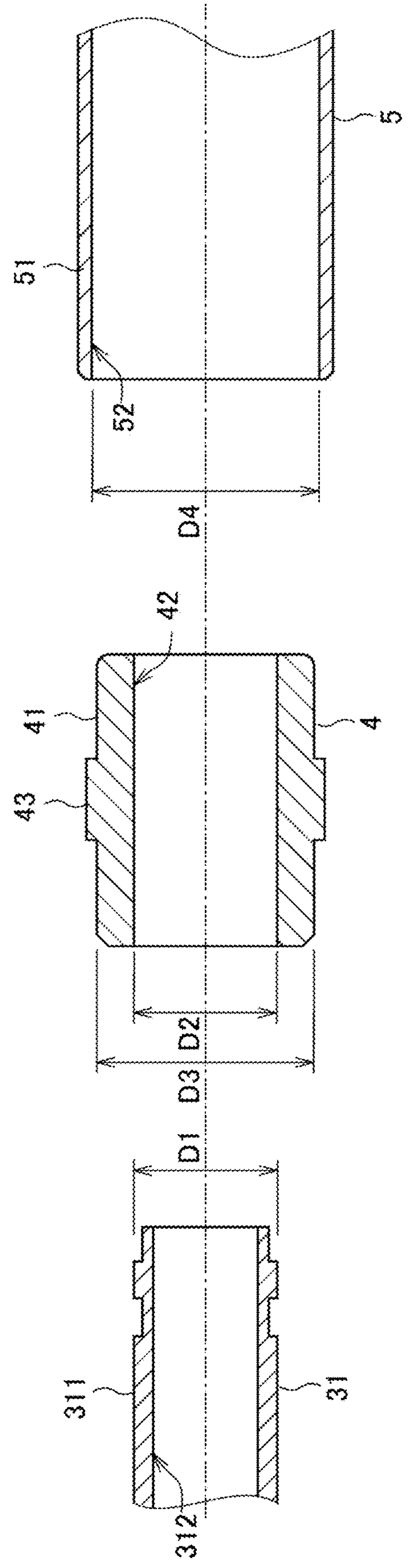
FIG. 5 is a sectional view of a cylindrical part, a crimping ring, and a cylinder member.

In FIG. 5, an inner diameter D2 of the cylinder member 4 is slightly greater than an outer diameter D1 of the cylindrical part 31 of the optical connector plug 3. The cylinder member 4 is attached to the cylindrical part 31 in such a manner that an inner circumferential surface 42 of the cylinder member 4 is in contact with an outer circumferential surface 311 of the cylindrical part 31. Preferably, after being attached to the cylindrical part 31, the cylinder member 4 is temporarily fixed by such a degree as to not come off or deviate in the axial direction from the cylindrical part 31, by crimping an outer circumferential surface 41 of the cylinder member 4 with the use of a crimping tool.

In FIG. 5, an inner diameter D4 of the crimping ring 5 is slightly greater than an outer diameter D3 of the cylinder member 4. The crimping ring 5 is fitted to the cylinder member 4 in such a manner that the tension member 13 of the optical fiber cable 1 is interposed between the outer circumferential surface 41 of the cylinder member 4, which is attached to the cylindrical part 31, and an inner circumferential surface 52 of the crimping ring 5. The crimping ring 5 is then crimped at an outer circumferential surface 51. Thus, the crimping ring 5 is fixed to the cylinder member 4.

Although the types of the crimping tools in crimping the cylinder member 4 and in crimping the crimping ring 5 are not limited, tools for holding a part to be crimped, from each side, are used. There is no limitation in the shape of a crimping hole that is formed in a crimping tool when it holds a part to be crimped, but for example, the shape is circular or is preferably polygonal, such as hexagonal.

In a case in which a crimping hole has a polygonal shape, the inner circumferential surface 52 of the crimping ring 5 is crimped to the outer circumferential surface 41 of the cylinder member 4 at a plurality of positions at equal intervals in the circumferential direction. This further increases a holding force against torque that is applied in a rotation direction of the optical fiber cable 1.

In one embodiment, the cylinder member 4 is formed with a protrusion 43 (an example of a first protrusion) that protrudes outward from the outer circumferential surface 41 approximately at the center in the axial direction, as shown in FIG. 5. It is not necessary to provide the protrusion 43. However, forming the protrusion 43 enables increasing stress that is applied to the outer circumferential surface 311 of the cylindrical part 31 at a position of the inner circumferential surface 42 of the cylinder member 4 corresponding to the protrusion 43, when the cylinder member 4 is crimped (temporarily fixed) to the cylindrical part 31. This improves the crimping force between the cylindrical part 31 and the cylinder member 4. After the cylinder member 4 is crimped to the cylindrical part 31, an inner circumferential surface 312 of the cylindrical part 31 is slightly bent inward at a position corresponding to the protrusion 43.

Providing the protrusion 43 to the cylinder member 4 also contributes to an improvement in a crimping force of the crimping ring 5 relative to the cylinder member 4. Specifically, in crimping the outer circumferential surface 51 of the crimping ring 5, the crimping ring 5 is firmly fixed to the cylinder member 4 due to the protrusion 43 formed to the cylinder member 4. At this time, the inner circumferential surface 312 of the cylindrical part 31 is further bent inward at the position corresponding to the protrusion 43 and is deformed to cause a decrease in the outer diameter.

Due to crimping the crimping ring 5, the tension member 13 is strongly supported between the surface of the protrusion 43 and the inner circumferential surface 52 of the crimping ring 5. This further increases a pull-out force of the optical fiber cable 1 from the optical connector plug 3.

Figure 6:
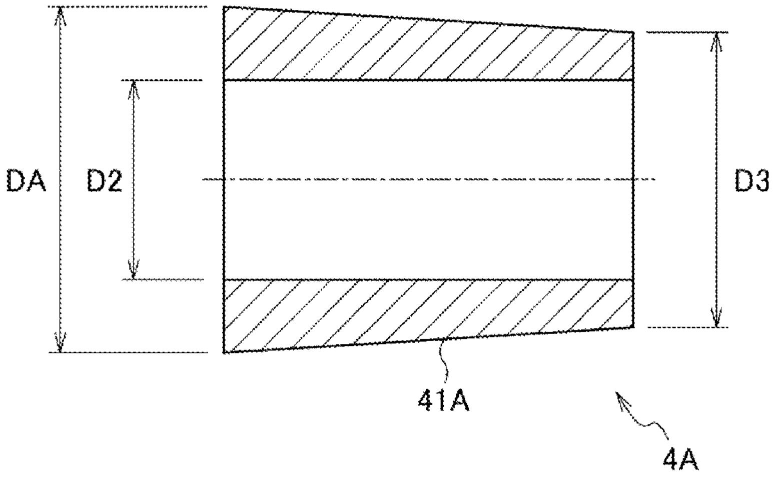
FIG. 6 is a sectional view of cylinder members according to modification examples.
Figure 6:
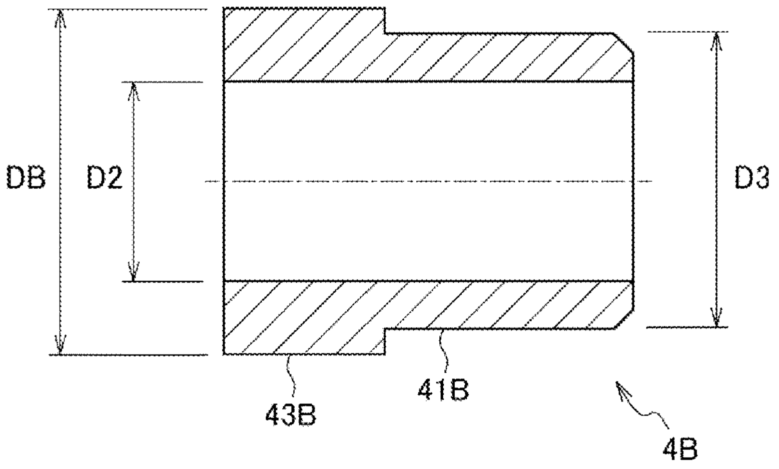
Figure 6:
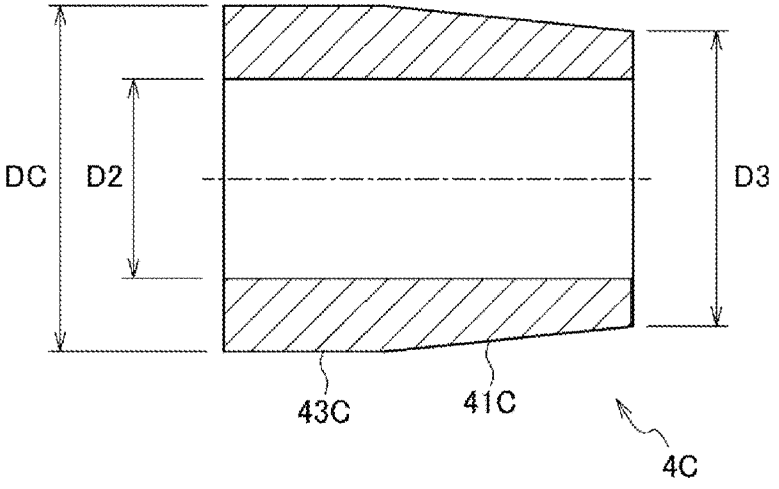

The protrusion 43 of the cylinder member 4 shown in FIG. 5 is an example of the first protrusion that protrudes outward from the outer circumferential surface. The first protrusion can also be implemented by using another shape. FIG. 6 shows cylinder members 4A, 4B, and 4C as examples of the cylinder member having a protrusion that protrudes outward from the outer circumferential surface.

In FIG. 6, the cylinder member 4A has the same inner diameter D2 as the cylinder member 4 in FIG. 5, but it has a tapered surface as an outer circumferential surface 41A. The outer diameter at the leading end of the cylinder member 4A is DA (>D3), whereas the outer diameter at the trailing end is D3. The outer circumferential surface 41A has a shape tapered from the leading end to the trailing end. The outer diameter D3 of the trailing end of the cylinder member 4A is the same as the outer diameter of the cylinder member 4, but it is slightly smaller than the inner diameter D4 of the crimping ring 5. The outer circumferential surface of the cylinder member 4A protrudes outward as it goes to the leading end, on the basis of the outer diameter D3 at the trailing end. The cylinder member 4A is crimped to the cylindrical part 31, and the crimping ring 5 is crimped to the cylinder member 4A, whereby the crimping force is increased. The outer circumferential surface may have a shape tapered from the trailing end to the leading end in a manner opposite to that of the cylinder member 4A.

In FIG. 6, the cylinder member 4B has the same inner diameter D2 as the cylinder member 4 in FIG. 5, but it differs from the cylinder member 4 in providing a protrusion 43B on the leading end side, instead of approximately at the center. That is, an outer diameter DB at the leading end of the cylinder member 4B is greater than the outer diameter D3 at the trailing end. In this case, the cylinder member 4B is crimped to the cylindrical part 31, and the crimping ring 5 is crimped to the cylinder member 4B, whereby stress on the leading end side of the cylinder member 4B is relatively increased, resulting in an increase in the crimping force. The protrusion may be provided on the trailing end side in a manner opposite to that of the cylinder member 4B.

In FIG. 6, the cylinder member 4C has the same inner diameter D2 as the cylinder member 4 in FIG. 5, but it differs from the cylinder member 4 in partially providing a tapered surface on the outer circumferential surface. An outer diameter DC at the leading end of the cylinder member 4C is greater than the outer diameter D3 at the trailing end. That is, the cylinder member 4C is provided with an outwardly protruding protrusion 43C on the leading end side and is formed with a tapered surface 41C on the trailing end side. In this case, the cylinder member 4C is crimped to the cylindrical part 31, and the crimping ring 5 is crimped to the cylinder member 4C, whereby stress on the leading end side of the cylinder member 4C is relatively increased, resulting in an increase in the crimping force. The protrusion on the outer circumferential surface may be provided on the trailing end side, whereas the tapered surface may be provided on the leading end side, in a manner opposite to those of the cylinder member 4C.

Figure 7:
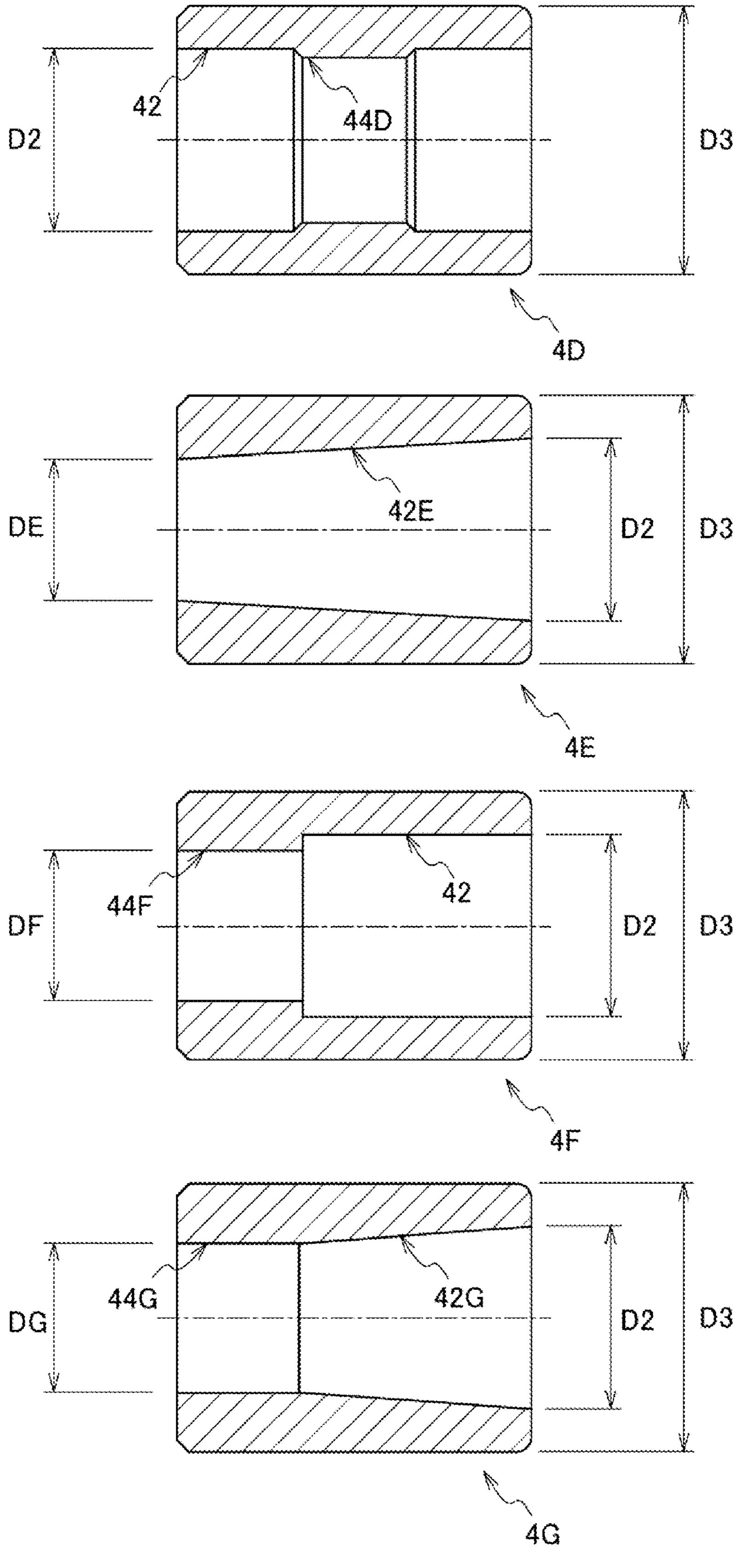
FIG. 7 is a sectional view of cylinder members according to modification examples.

For the purpose of increasing the crimping force, it is also effective to provide a second protrusion that protrudes inward from the inner circumferential surface, to the cylinder member, instead of or in addition to the first protrusion that protrudes outward from the outer circumferential surface. FIG. 7 shows cylinder members 4D to 4G as examples of having a second protrusion that protrudes inward from the inner circumferential surface. Each of the cylinder members 4D to 4G has the same outer diameter D3 as the cylinder member 4 shown in FIG. 5.

In FIG. 7, the cylinder member 4D is formed with an inwardly protruding protrusion 44D (an example of the second protrusion) approximately at the center of the inner circumferential surface 42, which has the same inner diameter D2 as that in FIG. 5.

The protrusion 44D increases stress for the outer circumferential surface 311 of the cylindrical part 31, when the cylinder member 4D is crimped (temporarily fixed) to the cylindrical part 31 of the optical connector plug 3. This improves the crimping force between the cylindrical part 31 and the cylinder member 4D. In this temporary fixation, the inner circumferential surface 312 of the cylindrical part 31 is slightly bent inward at a position corresponding to the protrusion 44D. In crimping the outer circumferential surface 51 of the crimping ring 5, due to the protrusion 44D formed to the cylinder member 4D, the inner circumferential surface 312 of the cylindrical part 31 is further bent inward at the position corresponding to the protrusion 44D, and the crimping ring 5, the cylinder member 4D, and the cylindrical part 31 are firmly fixed together. At this time, the tension member 13 is strongly supported between the outer circumferential surface of the cylinder member 4D and the inner circumferential surface 52 of the crimping ring 5.

In FIG. 7, the cylinder member 4E has the same outer diameter D3 as the cylinder member 4 in FIG. 5, but it has a tapered surface as an inner circumferential surface 42E. The inner diameter at the leading end of the cylinder member 4E is DE (<D2), whereas the inner diameter at the trailing end is D2. The inner circumferential surface 42E has a shape tapered from the trailing end to the leading end. The inner diameter D2 at the trailing end of the cylinder member 4E is slightly greater than the outer diameter D1 of the cylinder member 31. The inner circumferential surface 42E of the cylinder member 4E protrudes inward as it goes to the leading end, on the basis of the inner diameter D2 at the trailing end. The cylinder member 4E is crimped to the cylindrical part 31, and the crimping ring 5 is crimped to the cylinder member 4E, whereby stress on the leading end side of the cylinder member 4E is relatively increased, resulting in an increase in the crimping force. The inner circumferential surface may have a shape tapered from the leading end to the trailing end in a manner opposite to that of the cylinder member 4E.

In FIG. 7, the cylinder member 4F differs from the cylinder member 4D in providing an inwardly protruding protrusion 44F on the leading end side of the inner circumferential surface 42, instead of approximately at the center. That is, an inner diameter DF at the leading end of the cylinder member 4F is smaller than the inner diameter D2 at the trailing end. In this case, the cylinder member 4F is crimped to the cylindrical part 31, and the crimping ring 5 is crimped to the cylinder member 4F, whereby stress on the leading end side of the cylinder member 4F is relatively increased, resulting in an increase in the crimping force. The protrusion may be provided on the trailing end side in a manner opposite to that of the cylinder member 4F.

In FIG. 7, the cylinder member 4G has the same outer diameter D3 as the cylinder member 4 in FIG. 5, but it differs from the cylinder member 4 in partially providing a tapered surface on the inner circumferential surface. An inner diameter DG at the leading end of the cylinder member 4G is smaller than the inner diameter D2 at the trailing end. That is, the cylinder member 4G is provided with an inwardly protruding protrusion 44G on the leading end side and is formed with a tapered surface 42G on the trailing end side. In this case, the cylinder member 4G is crimped to the cylindrical part 31, and the crimping ring 5 is crimped to the cylinder member 4G, whereby stress on the leading end side of the cylinder member 4G is relatively increased, resulting in an increase in the crimping force. The protrusion on the inner circumferential surface may be provided on the trailing end side, whereas the tapered surface may be provided on the leading end side, in a manner opposite to those of the cylinder member 4G.

Next, a method for manufacturing the optical fiber cable with the optical connector of one embodiment will be described with reference to FIGS. 8 to 10. Each of FIGS. 8 to 10 sequentially shows steps of the method for manufacturing the optical fiber cable with the optical connector of one embodiment.

(1) Step ST1

Figure 8:
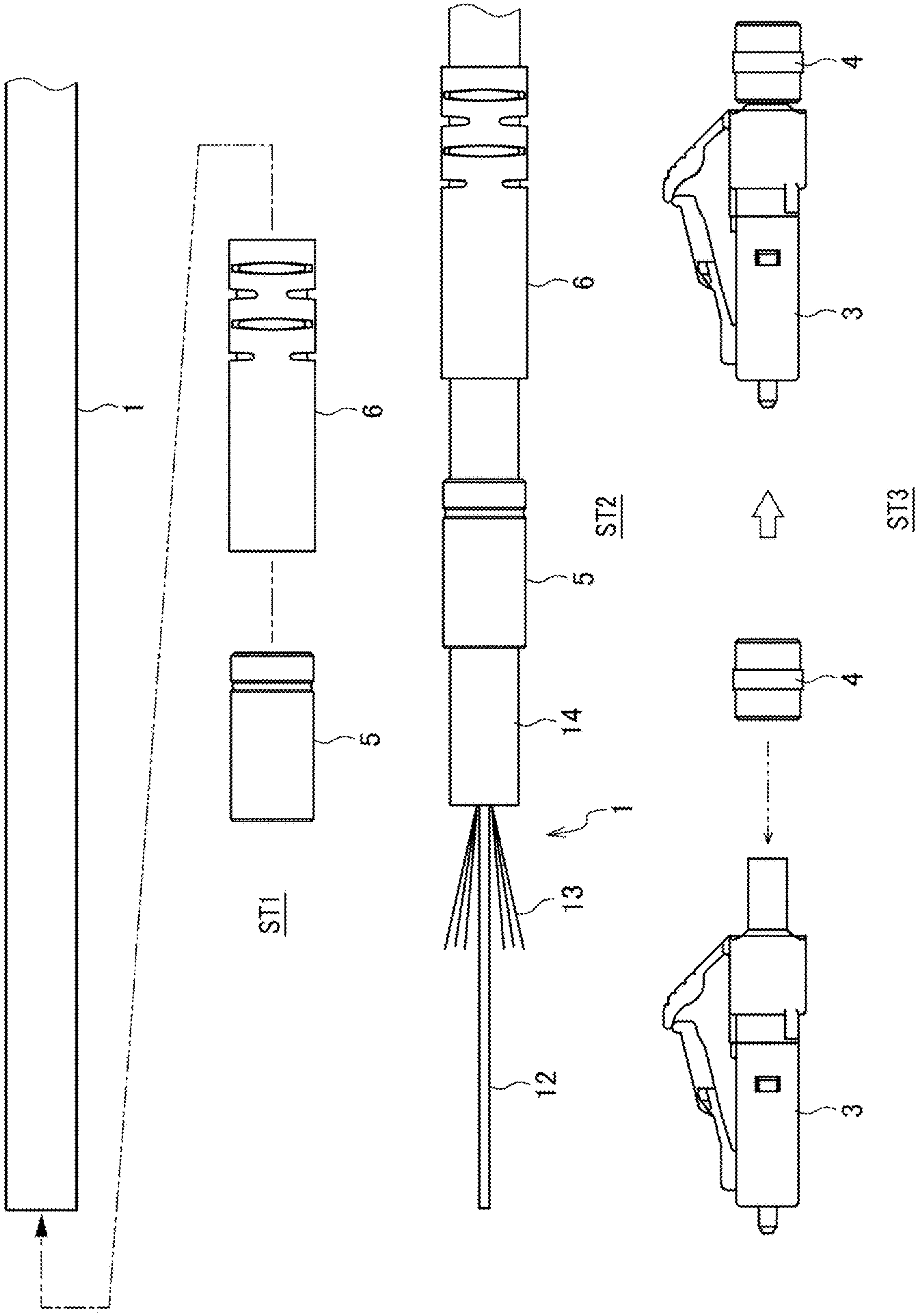
FIG. 8 shows a method for manufacturing the optical fiber cable with the optical connector of one embodiment.

With reference to FIG. 8, the optical fiber cable 1 is passed through the boot 6 and the cylindrical crimping ring 5 in step ST1.

(2) Step ST2

In step ST2, the outer jacket 14 of the optical fiber cable 1 is removed to expose the core wire 12, which covers the optical fiber 11, and to expose the tension member 13, which is disposed around the core wire 12. At this time, exposure is performed stepwise so as to form a part from which only the outer jacket 14 is removed, and a part from which the outer jacket 14 and the tension member 13 are removed. The length from a leading end of the outer jacket 14 to a leading end of the core wire 12 (length of the core wire 12 that is exposed) is in a range of not less than 10 mm and not greater than 50 mm. The length of the tension member 13 exposed from the outer jacket 14 is in a range of not less than 5 mm and not greater than 20 mm. However, these lengths are not limited thereto.

(3) Step ST3

In step ST3, the cylinder member 4 is attached to the cylindrical part 31 in such a manner that the inner circumferential surface of the cylinder member 4 is in contact with the outer circumferential surface of the cylindrical part 31, which is provided to the optical connector plug 3. The cylinder member 4 is preferably formed with a protrusion on one or each of the outer circumferential surface and the inner circumferential surface, as described with reference to FIGS. 5 to 7.

(4) Step ST4

Figure 9:
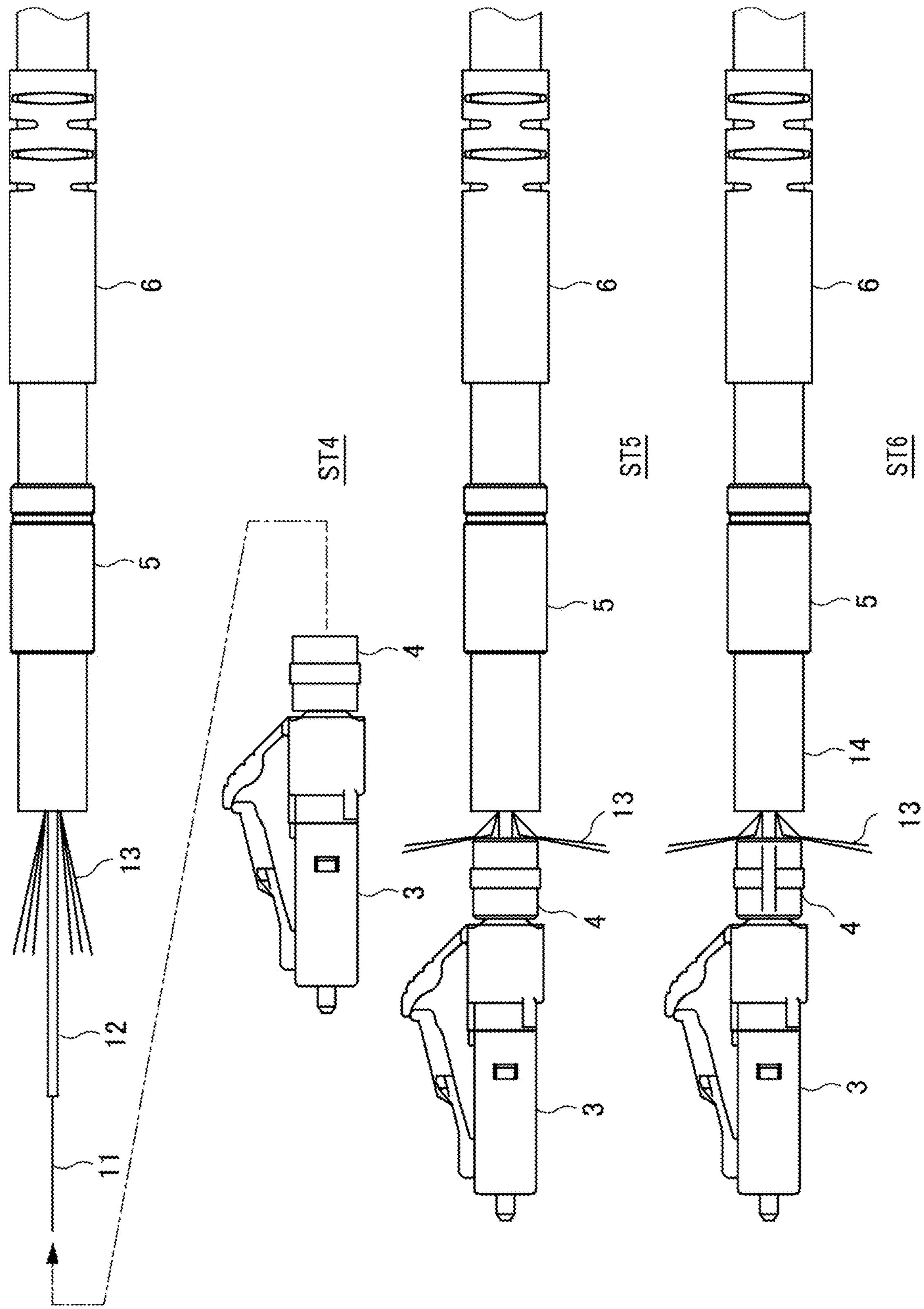
FIG. 9 shows the method for manufacturing the optical fiber cable with the optical connector of one embodiment.
Figure 10:
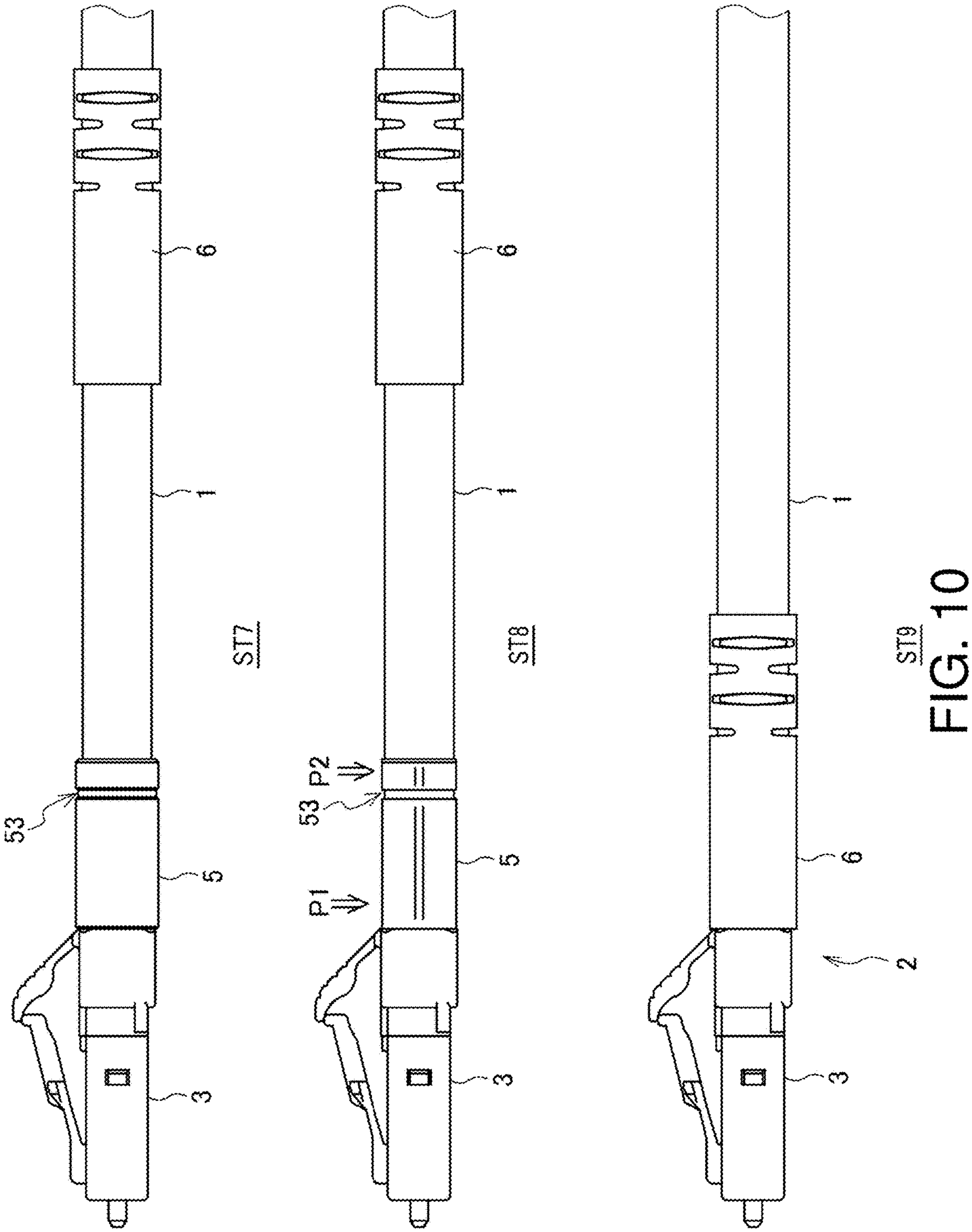
FIG. 10 shows the method for manufacturing the optical fiber cable with the optical connector of one embodiment.

With reference to FIG. 9, the core wire 12 is removed at a leading end of the optical fiber cable 1 to expose the optical fiber 11. The length of the optical fiber 11 that is exposed is in a range of not less than 5 mm and not greater than 15 mm, but not limited thereto.

(5) Step ST5

In step ST5, the exposed optical fiber 11 is fixed to the ferrule 33 of the optical fiber cable 1 by bonding. Specifically, thermosetting adhesive is injected into the through hole of the ferrule 33 from a dispenser (syringe) containing the thermosetting adhesive, via the trailing end of the cylindrical part 31 and the tube 36 (refer to FIG. 4). Then, the leading end of the exposed optical fiber 11 is inserted into the through hole that is formed in the ferrule 33. After the leading end of the optical fiber 11 is inserted into the through hole, the thermosetting adhesive is cured by heating the ferrule 33.

(6) Step ST6

In step ST6, the inner circumferential surface of the cylinder member 4 is at least partially crimped (temporarily fixed) to at least a part of the outer circumferential surface of the cylindrical part 31 of the optical connector plug 3. The cylinder member 4 is temporarily fixed to the cylindrical part 31 in order to prevent the cylinder member 4 from coming off or deviating in the axial direction from the cylindrical part 31 during a working process.

Nevertheless, it is not essential to temporarily fix the cylinder member 4 to the cylindrical part 31 by crimping. In one example, the cylinder member 4 may be press-fitted to the cylindrical part 31 of the optical connector plug 3 in step ST3 so as to not come off or deviate in the axial direction from the cylindrical part 31. Then, step ST6 is not required.

(7) Step ST7

In step ST7, the crimping ring 5 is slid in the axial direction and is disposed around the cylinder member 4. In this case, a trailing end of the second housing part 35B (refer to FIG. 4) of the optical connector plug 3 functions as a stopper of the crimping ring 5. In this state, the crimping ring 5 is disposed at a position so that at least a part of the inner circumferential surface of the crimping ring 5 can be crimped to at least a part of the outer circumferential surface of the cylinder member 4 while having the tension member 13 of the optical fiber cable 1 therebetween, at the first position P1 in the axial direction. The crimping ring 5 is also disposed at a position so that at least a part of the inner circumferential surface of the crimping ring 5 can be crimped to the outer jacket 14 of the optical fiber cable 1, at the second position P2 in the axial direction.

(8) Step ST8

In step ST8, the inner circumferential surface of the crimping ring 5 is at least partially crimped to at least a part of the outer circumferential surface of the cylinder member 4 while having the tension member 13 of the optical fiber cable 1 therebetween, at the first position P1 in the axial direction (an example of a first crimping step). Moreover, in step ST8, the inner circumferential surface of the crimping ring 5 is also at least partially crimped to the outer jacket 14 of the optical fiber cable 1, at the second position P2 in the axial direction (an example of a second crimping step). The cylindrical part 31 of the optical connector plug 3, the cylinder member 4, and the crimping ring 5 are firmly fixed together in step ST8.

Crimping the crimping ring 5 at the first position P1 and crimping the crimping ring 5 at the second position P2 may be performed simultaneously in a case in which an axial distance between the first position P1 and the second position P2 is not greater than the width of a crimping tool (e.g., not greater than 10 mm). This reduces a workload of steps compared with the case of performing the crimping operation twice by sliding a crimping tool.

(9) Step ST9

In step ST9, the boot 6 is slid in the axial direction to be engaged with the crimping ring 5. Specifically, a protrusion (not shown) on an inner circumferential surface of the boot 6 is engaged with the engaging groove 53 of the crimping ring 5, whereby the boot 6 is positioned in the axial direction.

After the above-described steps are performed, the optical fiber cable with the optical connector shown in FIGS. 1A and 1B is completed.

As described above, the optical fiber cable with the optical connector of one embodiment is provided with the cylinder member 4 that is interposed between the cylindrical part 31 of the optical connector plug 3 and the crimping ring 5. The cylinder member 4 is attached to the cylindrical part 31 in such a manner that the inner circumferential surface 42 of the cylinder member 4 is in contact with the outer circumferential surface 311 of the cylindrical part 31. In the crimping ring 5, the inner circumferential surface 52 is at least partially crimped to at least a part of the outer circumferential surface 41 of the cylinder member 4 while having the tension member 13 of the optical fiber cable 1 therebetween, at the first position in the axial direction. In addition, the inner circumferential surface 52 is also at least partially crimped to the outer jacket 14 of the optical fiber cable 1, at the second position in the axial direction. That is, in attaching the optical fiber cable 1 having a relatively large outer diameter, to the optical connector plug 3, the cylinder member 4 is disposed so as to absorb the difference between the inner diameter of the crimping ring 5 and the outer diameter of the cylindrical part 31. Thus, it is possible to reduce the total length of the optical connector. In this state, the cylindrical part 31, the cylinder member 4, and the crimping ring 5 are firmly fixed together by crimping.

In one embodiment, the cylinder member 4 is provided with one or both of the first protrusion, which protrudes outward from the outer circumferential surface, and the second protrusion, which protrudes inward from the inner circumferential surface. This structure further increases the crimping force of the cylinder member 4 relative to the cylindrical part 31 and the crimping force of the crimping ring 5 relative to the cylinder member 4.

In one embodiment, a crimping tool having a hole with a polygonal shape, such as a hexagonal shape, is used to perform crimping (e.g., hexagonal swaging) on a part to be crimped, whereby a holding force against rotational torque that is generated in the optical fiber cable 1, is further increased.

Although embodiments of the optical fiber cable with the optical connector, the method for manufacturing the optical fiber cable with the optical connector, and the optical connector of the present invention are described above, the present invention should not be limited to the foregoing embodiments. In addition, various modifications and changes can be made to the above-described embodiments within the scope not departing from the gist of the present invention.

For example, although a case of using an LC connector is described in relation to the foregoing embodiments, the present invention can also be used in an SC connector, an MU connector, and other connectors. The type of the connector is not limited thereto, and the present invention can also be used in optical connectors having similar structures.

The invention claimed is:

1. An optical fiber cable with an optical connector, comprising:

an optical fiber cable; and an optical connector, the optical fiber cable comprising:

an optical fiber;

a coating member covering the optical fiber;

a tension member being disposed around the coating member; and an outer jacket containing the optical fiber, the coating member, and the tension member, the optical connector comprising:

an optical connector plug having a ferrule and a cylindrical part, the ferrule being disposed so as to protrude from a leading end and being formed with an insertion hole for the optical fiber, the cylindrical part being provided so as to protrude from a trailing end that is on a side opposite to the leading end;

a crimping member being configured to fix the optical fiber cable to the optical connector plug by crimping; and a cylinder member being interposed between the cylindrical part and the crimping member, the cylinder member and the optical connector plug being individual separate components, the cylinder member being attached to the cylindrical part in such a manner that an inner circumferential surface of the cylinder member is in contact with an outer circumferential surface of the cylindrical part, the crimping member having a cylindrical shape, an inner circumferential surface of the crimping member being at least partially crimped to at least a part of an outer circumferential surface of the cylinder member while having the tension member of the optical fiber cable therebetween, at a first position in an axial direction at which the inner circumferential surface of the cylinder member is in contact with the outer circumferential surface of the cylindrical part, the inner circumferential surface of the crimping member being at least partially crimped to the outer jacket of the optical fiber cable, at a second position in the axial direction, wherein the inner circumferential surface of the crimping member is crimped to the outer circumferential surface of the cylinder member at a plurality of positions at equal intervals in a circumferential direction.

2. The optical fiber cable with the optical connector according to claim 1, wherein the inner circumferential surface of the cylinder member is at least partially crimped to at least a part of the outer circumferential surface of the cylindrical part.

3. The optical fiber cable with the optical connector according to claim 2, wherein the cylinder member has a first protrusion that protrudes outward from the outer circumferential surface.

4. The optical fiber cable with the optical connector according to claim 2, wherein the cylinder member has a second protrusion that protrudes inward from the inner circumferential surface.

5. The optical fiber cable with the optical connector according to claim 1, wherein the cylinder member has a first protrusion that protrudes outward from the outer circumferential surface.

6. The optical fiber cable with the optical connector according to claim 1, wherein the cylinder member has a second protrusion that protrudes inward from the inner circumferential surface.

7. A method for manufacturing an optical fiber cable with an optical connector, comprising:

a step of passing an optical fiber cable through a cylindrical crimping member;

a step of removing an outer jacket of the optical fiber cable to expose a coating member, which covers an optical fiber, and to expose a tension member, which is disposed around the coating member;

a step of providing a cylinder member that is individual and separate from a cylindrical part that is provided to an optical connector plug;

a step of attaching the cylinder member to the cylindrical part in such a manner that an inner circumferential surface of the cylinder member is in contact with an outer circumferential surface of the cylindrical part, a step of removing the coating member at a leading end of the optical fiber cable to expose the optical fiber;

a step of fixing the optical fiber that is exposed, to a ferrule of the optical connector plug by bonding;

a first crimping step of sliding the crimping member in an axial direction, and crimping at least a part of an inner circumferential surface of the crimping member to at least a part of an outer circumferential surface of the cylinder member while having the tension member of the optical fiber cable therebetween, at a first position in the axial direction at which the inner circumferential surface of the cylinder member is in contact with the outer circumferential surface of the cylindrical part; and a second crimping step of crimping at least a part of the inner circumferential surface of the crimping member to the outer jacket of the optical fiber cable, at a second position in the axial direction, wherein the inner circumferential surface of the crimping member is crimped to the outer circumferential surface of the cylinder member at a plurality of positions at equal intervals in a circumferential direction.

8. The method for manufacturing the optical fiber cable with the optical connector according to claim 7, wherein the step of attaching the cylinder member to the cylindrical part, includes crimping at least a part of the inner circumferential surface of the cylinder member to at least a part of the outer circumferential surface of the cylindrical part of the optical connector plug.

9. The method for manufacturing the optical fiber cable with the optical connector according to claim 8, wherein the first crimping step and the second crimping step are performed simultaneously.

10. The method for manufacturing the optical fiber cable with the optical connector according to claim 7, wherein the first crimping step and the second crimping step are performed simultaneously.

11. An optical connector being configured to be attached to an optical fiber cable, the optical connector comprising:

an optical connector plug having a ferrule and a cylindrical part, the ferrule being disposed so as to protrude from a leading end and being formed with an insertion hole for an optical fiber, the cylindrical part being provided so as to protrude from a trailing end that is on a side opposite to the leading end;

a crimping member; and a cylinder member, the cylinder member and the optical connector plug being individual separate components, the cylinder member being attached to the cylindrical part in such a manner that at least a part of an inner circumferential surface is in contact with at least a part of an outer circumferential surface of the cylindrical part, the crimping member having a cylindrical shape, the crimping member being disposed so that at least a part of an inner circumferential surface of the crimping member is able to be crimped to at least a part of an outer circumferential surface of the cylinder member while having a tension member of the optical fiber cable therebetween, at a first position in an axial direction of the crimping member at which the inner circumferential surface of the cylinder member is in contact with the outer circumferential surface of the cylindrical part, and at least a part of the inner circumferential surface of the crimping member is able to be crimped to an outer jacket of the optical fiber cable, at a second position in the axial direction of the crimping member, wherein the inner circumferential surface of the crimping member is crimped to the outer circumferential surface of the cylinder member at a plurality of positions at equal intervals in a circumferential direction.

12. The optical connector according to claim 11, wherein the inner circumferential surface of the cylinder member is at least partially crimped to at least a part of the outer circumferential surface of the cylindrical part.

13. The optical connector according to claim 12, wherein the cylinder member has a first protrusion that protrudes outward from the outer circumferential surface.

14. The optical connector according to claim 12, wherein the cylinder member has a second protrusion that protrudes inward from the inner circumferential surface.

15. The optical connector according to claim 11, wherein the cylinder member has a first protrusion that protrudes outward from the outer circumferential surface.

16. The optical connector according to claim 11, wherein the cylinder member has a second protrusion that protrudes inward from the inner circumferential surface.

* * * * *